No. 693,652. Patented Feb. 18, 1902.
J. A. KELLER.
SAFETY PACKING BOX.
(Application filed Nov. 30, 1901.)

(No Model.)

WITNESSES.
J. J. Richardson
Sherman Williams

INVENTOR.
John A. Keller,
By Robert S. Carr,
Atty.

THE NORRIS PETERS CO., PHOTO-LITHO., WASHINGTON, D. C.

UNITED STATES PATENT OFFICE.

JOHN A. KELLER, OF HAMILTON, OHIO.

SAFETY PACKING-BOX.

SPECIFICATION forming part of Letters Patent No. 693,652, dated February 18, 1902.

Application filed November 30, 1901. Serial No. 84,269. (No model.)

*To all whom it may concern:*

Be it known that I, JOHN A. KELLER, a citizen of the United States, residing at Hamilton, Ohio, have invented a new and useful Improvement in Safety Packing-Boxes, of which the following is a specification.

My invention relates to safety packing-boxes of that class adapted to use on rotative steam-driers and elsewhere; and the object of my improvement is to provide means for the automatic discharge of the excess of steam above a predetermined pressure. This object is attained in the following-described manner, as illustrated in the accompanying drawings, in which—

Figure 1:
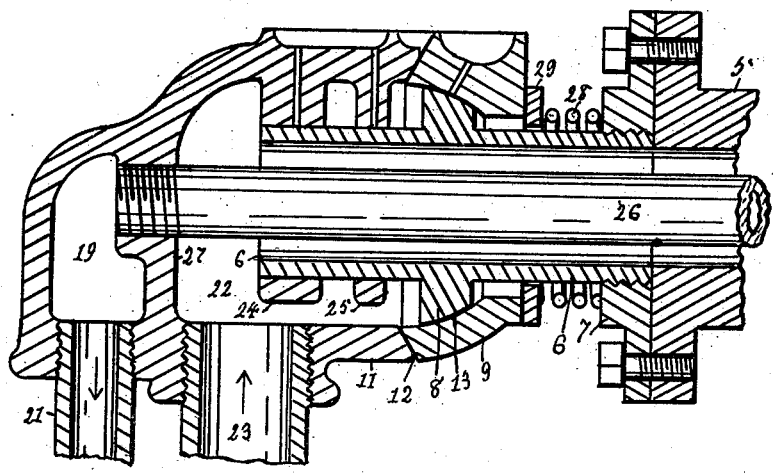
Figure 3:
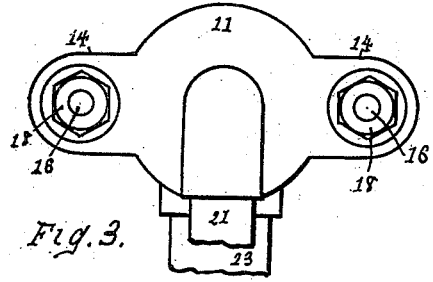
Figure 2:
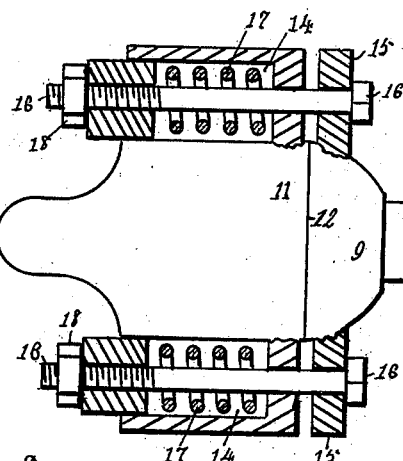

Figure 1 is a longitudinal section of a packing-box embodying my improvement; Fig. 2, a plan with parts in section; Fig. 3, a front elevation, and Fig. 4 a sectional view of a modified form of the supply-pipe with packing-ring thereon.

Figure 4:
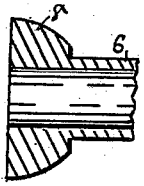

In the drawings, 5 represents the end portion of the hollow journal of a rotative steam-drier. Steam-supply pipe 6 is removably secured thereon by means of cap 7 and forms an axial extension of said journal. Packing-ring 8, usually formed on said pipe, preferably resembles the segment of a sphere. A cylindrical casing, which consists of members 9 and 11, yieldingly secured together to form a steam-tight joint 12 between their contiguous ends, is mounted on the supply-pipe. Ring 8 is rotatively seated in seat 13, formed on the inner side of member 9, and which seat supplements the spherical contact-surface of said ring therewith, whereby the leakage of steam around the pipe is prevented and the pipe is permitted to rotate in different angles to the axis of the casing thereon. Pockets 14 are formed on opposite sides of member 11, and lugs 15 project from opposite sides of member 9 in registration therewith. Bolts 16, inserted through corresponding lugs and pockets, are provided with adjustable springs 17, which are concealed within the pockets, and with nuts 18, which serve to adjust the springs to clamp members 9 and 11 together with more or less force. Member 11 of the casing contains chamber 19, which discharges through pipe 21, and steam-pressure chamber 22, formed partly within both members of the casing, is supplied with steam through inlet-pipe 23 from a generator (not shown) and communicates with the interior of the drier through supply-pipe 6. Bearings 24 and 25, formed on the inside of member 11, depend within steam-chamber 22 for the rotation therein of the extremity of pipe 6. Said pipe serves also as a guide whereon member 11 is movable longitudinally in and out of engagement with member 9 by means of springs 17 and the pressure of the steam in chamber 22. When the pressure of the steam in chamber 22 is sufficient to overcome the clamping force of the springs in various predetermined adjustments, the members of the casing are forced apart and the excess of steam-pressure escapes through joint 12. Siphon-pipe 26 is secured at one end in partition 27, which is formed within member 11 between chamber 19, with which it communicates, and chamber 22. Said pipe is extended through the steam-chamber and the interior of the supply-pipe to the interior of the drier, where it terminates in the usual manner to drain the condensed steam therefrom. Spring 28 encircles pipe 6 between cap 7 and collar 29, which is loosely mounted on said pipe in rotative contact with the rear end of the casing. It serves to assist low steam-pressure within chamber 22 in maintaining packing-ring 8 in close contact with its seat 13 and prevent the leakage of steam around the supply-pipe. The movement of pipe 6 to different angles to the axis of the casing is limited by bearings 24 and 25 to the extent of its looseness therein when it becomes worn. To permit the supply-pipe to rotate at greater angles to the axis of the casing, its front end is terminated near ring 8 thereon, as shown in Fig. 4.

Having fully described my improvement, what I claim as my invention, and desire to secure by Letters Patent of the United States, is—

1. The combination with a stationary casing consisting of two members inclosing a steam-chamber, springs arranged to yieldingly clamp them together of a rotative pipe communicating with the interior of the chamber through an opening formed in one member of the casing and means to prevent the escape of steam from the casing around the pipe through the opening.

2. The combination with a stationary casing consisting of two members separably clamped together by means of springs, of a rotative pipe communicating through an opening formed in the wall of the casing with its interior, and a spherical packing-box between the pipe and said wall adapted to prevent the escape of steam around the pipe through the opening.

3. The combination with a casing consisting of two members separably clamped together by means of springs and inclosing a steam-pressure chamber between them, of a rotative pipe leading from said chamber through the wall of one of said members and journaled in a bearing formed within the other member and whereon said member is movable longitudinally, and a packing-box arranged to prevent the escape of steam around the pipe from the chamber.

4. The combination with a casing consisting of two members separably clamped together by means of springs and inclosing a steam-chamber, of a rotative pipe communicating through the wall of the casing with the chamber, a resisting-collar on the pipe within the chamber, and a seat therefor on the inner surface of said wall to prevent the leakage of steam around the pipe, whereby the casing automatically separates under a predetermined pressure of steam within the chamber by overcoming the clamping force of the springs.

5. The combination with a stationary casing consisting of two members forcibly maintained in contact by means of adjustable spring mechanism and containing a steam-pressure chamber, of a rotative steam-pipe communicating with the interior of said chamber through an opening in the wall of the casing, a resisting-collar on the pipe within the chamber, a seat for the rotation of the collar thereon and formed within the wall concentric with said opening therein, and a spring arranged without the casing to maintain said collar forcibly in contact with said seat.

JOHN A. KELLER.

Witnesses:
R. S. CARR,
SHERMAN WILLIAMS.